United States Patent [19]

Kroll et al.

[11] Patent Number: 5,018,361
[45] Date of Patent: May 28, 1991

[54] METHOD AND APPARATUS FOR DISPOSAL AND REPROCESSING OF ENVIRONMENTALLY HAZARDOUS SUBSTANCES FROM REFRIGERATION SYSTEMS

[75] Inventors: Willi Kroll, Herne; Klaus Augstein, Mulheim/Ruhr, both of Fed. Rep. of Germany

[73] Assignee: KSR Kuhlsysteme und Recycling GmbH & Co. KG, Fed. Rep. of Germany

[21] Appl. No.: 314,656

[22] Filed: Feb. 23, 1989

[30] Foreign Application Priority Data

Feb. 9, 1988 [DE] Fed. Rep. of Germany ....... 3829923
Feb. 26, 1988 [DE] Fed. Rep. of Germany ....... 3806011

[51] Int. Cl.⁵ ............................................. F25B 47/00
[52] U.S. Cl. .......................................... 62/85; 62/292; 62/470
[58] Field of Search .................. 62/149, 292, 85, 475, 62/503, 470

[56] References Cited

U.S. PATENT DOCUMENTS 4,646,527 3/1987 Taylor ............................... 62/149 X
4,805,416 2/1989 Manz et al. ............................ 62/292

FOREIGN PATENT DOCUMENTS 3001224 7/1980 Fed. Rep. of Germany .

Primary Examiner—Henry A. Bennett
Attorney, Agent, or Firm—Reese Taylor

[57] ABSTRACT

In a method for the disposal and recovery of environmentally harmful substances, especially refrigerant from refrigerant systems, in which the refrigerant is aspirated from the refrigeration system with the aid of a compressor and liquefied, and after passing through an oil filter supplied to a disposal container, the invention provides that on its way to the compressor, the refrigerant is kept in the gaseous state by heating and is freed of foreign substances such as oil, water and dirt, which are collected in separate containers, and on its way from the compressor to the disposal container, in the liquid state, is subjected to further cleaning to remove the aforementioned substances.

12 Claims, 4 Drawing Sheets

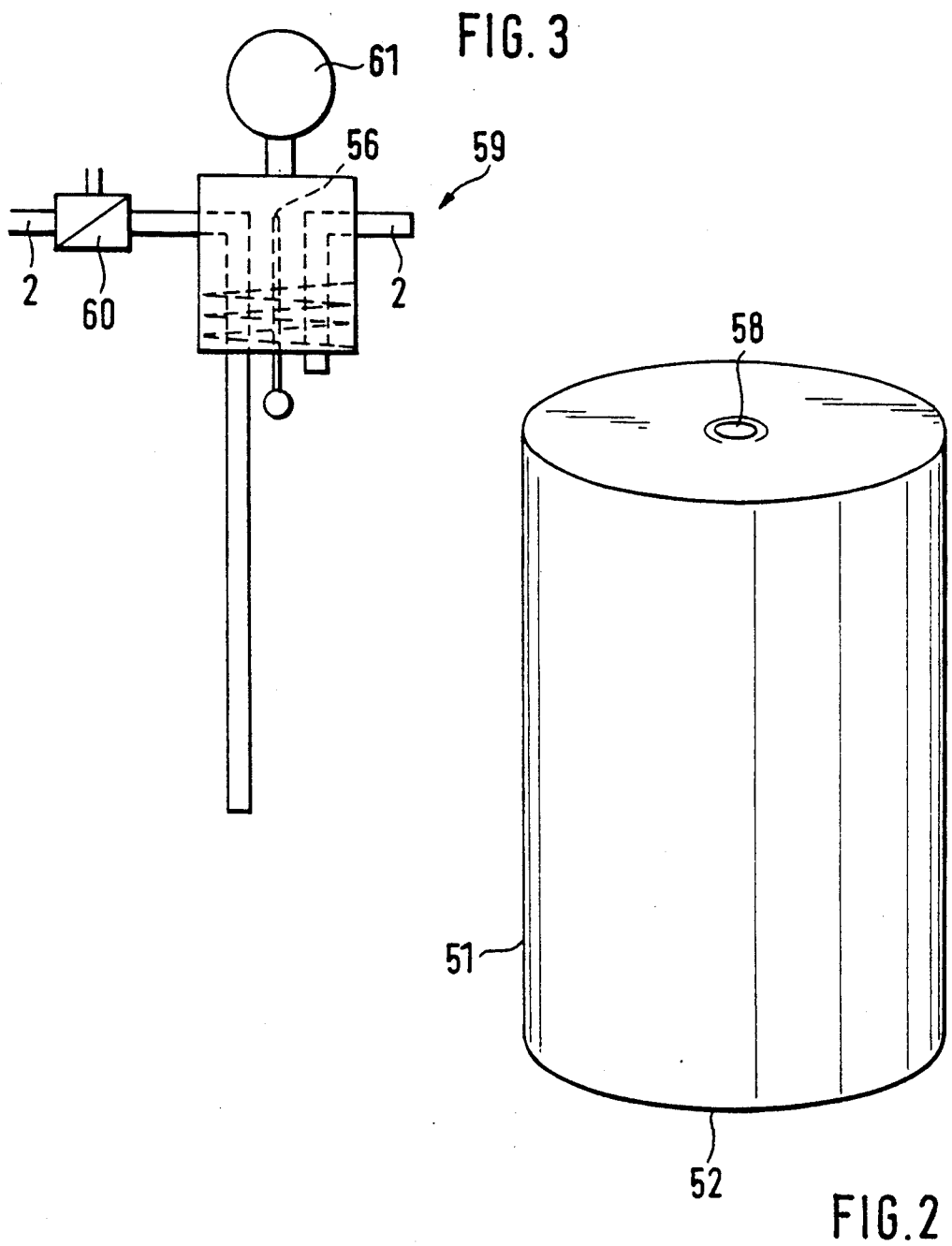

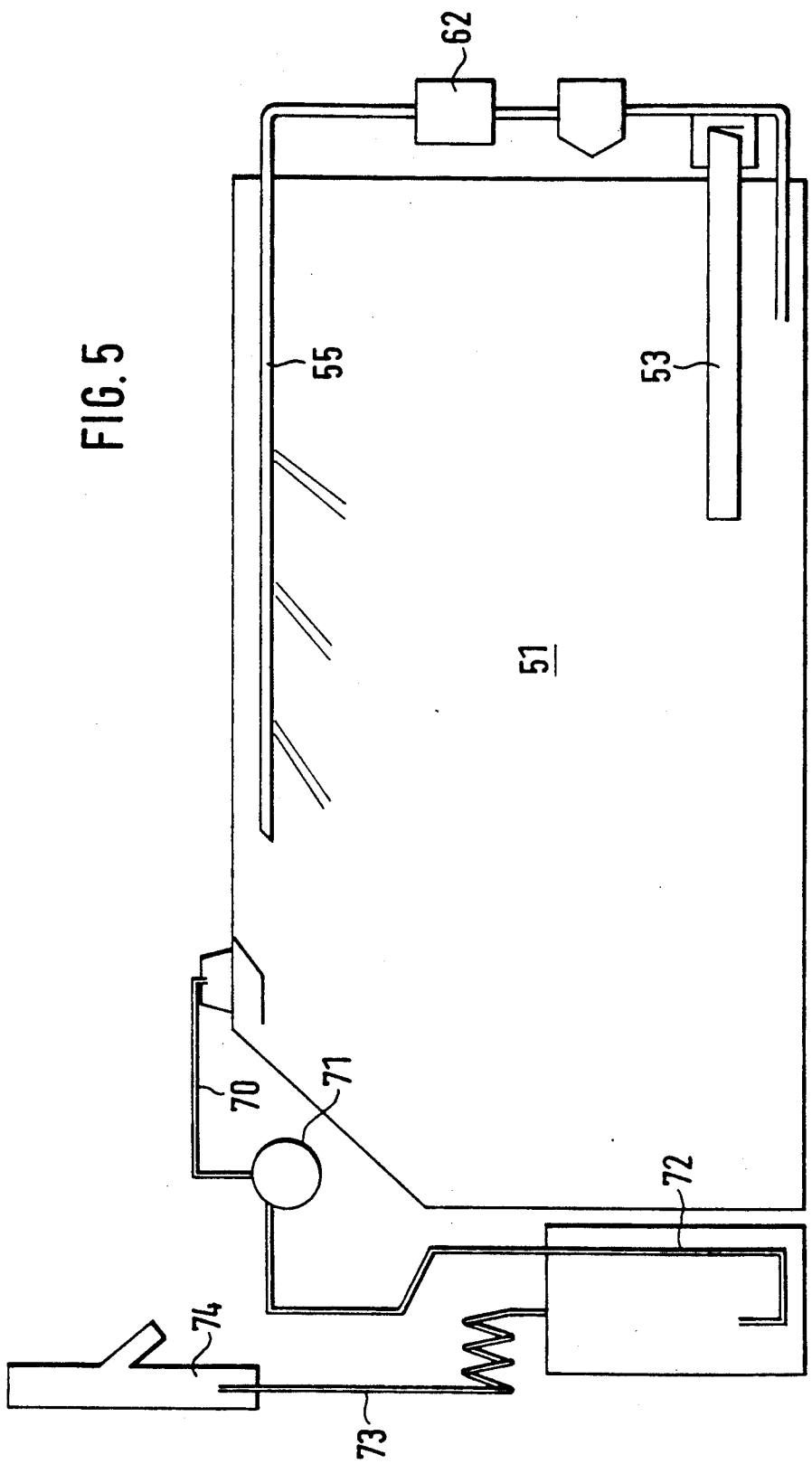

METHOD AND APPARATUS FOR DISPOSAL AND REPROCESSING OF ENVIRONMENTALLY HAZARDOUS SUBSTANCES FROM REFRIGERATION SYSTEMS

FIELD OF THE INVENTION

The invention relates to a method and apparatus for disposal and reprocessing of environmentally hazardous substances from refrigeration systems.

BACKGROUND OF THE INVENTION

Among these substances, the group of Freons, such as Freon R12, R22, R512, F11, and so forth, make up a very large proportion. In their free state, these halogenated hydrocarbons, in particular chlorinated fluorocarbons, are one of the primary causes for the destruction of the ozone layer in the atmosphere. These toxic substances are liberated when spray cans are used, for instance, or in the manufacture of plastics.

The most recent figures for the Federal Republic of Germany indicate that 2.3 million household refrigerators and freezers are disposed of annually as trash, or are taken to garbage dumps and scrap dealers. As a rule, the refrigerating cycle is destroyed in this process, so approximately 350 metric tons of refrigerants of the above type escape into the atmosphere each year and contribute to the destruction of the ozone layer. In addition, approximately 900,000 liters of used oil leak out of the refrigerator compressors into the ground every year. Other systems however, such as large refrigeration plants or heat pumps, also contribute in this way to the environmental burden.

Attempts are therefore now being made to regulate the disposal of such systems and equipment by law. Refrigerators, for instance, are to be collected separately. Prior to the final dismantling or scrapping, the refrigerant and the used oil are to be collected and re-used after processing.

In some known methods for disposing of the refrigerant, the refrigerant is simply aspirated from the refrigeration cycle and collected in containers in the gaseous state. These methods have the disadvantage, however, that it takes up to nine hours to aspirate the refrigerant from a single refrigerator. A further disadvantage of these methods is that very large containers must be used to collect the gaseous Freon.

Other methods are also known, for instance from German Patent 30 01 224, in which the refrigerant is extracted from the refrigeration system by means of a compressor and supplied in liquid form to a pressure vessel. This vessel is connected to a weight switch, which switches off the delivery of any further refrigerant once a predetermined total weight is attained. For performing this method, an apparatus is used that is either portable or transportable on a vehicle. A major disadvantage of the previously known system is that it requires a great number of manually actuated valves to control the drainage process. Malfunction-free operation of the system can be done only by carefully trained persons. A further disadvantage is the fact that the recovered refrigerant is highly contaminated, not only by foreign substances such as oil and water that had already been absorbed in the refrigeration cycle, but also by oil and dirt from the compressor in the recovery system. The contaminated refrigerant can then either be reprocessed, which is expensive, or it must be destroyed. If it is to be destroyed, very high temperatures must be generated for combusting the refrigerant; otherwise, the dioxides and other toxic substances that are produced will be liberated. Similar methods and apparatus, having the same disadvantages, are known for instance from German Utility Model 87 08 522 or German Published, Non-Prosecuted Application 36 16 591. In connection with German Utility Model 87 08 522, it should also be noted that in that system, an oil separator is disposed downstream of the compressor; the oil separator is intended for removing oil from the refrigerant to be recovered, and the oil is returned to the compressor. The contaminated refrigerant already in the refrigeration system accordingly reaches the compressor in an uncleaned state, which can damage or even destroy the compressor. The recovered refrigerant from which the oil has been removed still includes other contaminants, however, which prevent immediate re-use of the refrigerant.

OBJECT AND SUMMARY OF THE INVENTION

It is therefore the object of the invention to perform a method of the above type such that the recovered refrigerant and the used oil can both be re-used directly.

The Freon present in the refrigeration systems that are to be disposed of is aspirated from the refrigeration cycle by the compressor, via an existing outlet point in the refrigeration cycle or through a tap valve, and is compressed by the compressor to a pressure of up to 20 bar. Before the refrigerant reaches the compressor, a heating apparatus provides that the refrigerant remains in the gaseous state and reaches the compressor in this state. On the way to the compressor, the refrigerant is undergoes a cleaning operation, in which oil, water, and other contaminant particles are removed from the refrigerant. In the gaseous phase and cleaned, the refrigerant reaches the compressor, where it is liquefied. The precleaning of the refrigerant has the advantage that the compressor can be neither contaminated nor damaged by the foreign components in the refrigerant. The refrigerant liquefied by the compressor then likewise flows through the aforementioned three cleaning stations, namely, first an oil filter, then a water filter, and finally an activated charcoal filter for the additional foreign substances. The oil filter is provided with a heater, which heats the oil extracted from the refrigerant, so that remaining Freons are liberated and delivered to the reprocessing operation. The oil, like the water, that is present is collected in additional containers. It is provided that the mixture of refrigerant and oil is first carried to a container in which the oil settles to the bottom, while the evaporating Freon collects above the surface of the oil and can be aspirated. So that any remaining Freons can be separated from the oil as well, the oil is heated while being continuously circulated and is supplied to a spray apparatus that causes the heated oil, finely distributed, to rain down again in the container so that the heated, finely-distributed oil causes the remaining Freons to volatilize. These remaining Freons, too, can then be delivered for further refrigerant processing. However, it is also possible for these not completely clean refrigerant components to be subjected to filtration with milk of lime, in which the refrigerant is chemically decomposed. Any still-remaining components of the Freon are then combusted in an afterburner system at 900° C. The oil collecting container and the circulating container can be separate from one another. Alternatively, however, it is also possible to combine the two containers in one. Advantageously, the container is provided with a fill level gauge and a manometer. Furthermore, the circulated oil also travels through an additional oil filter. The cleaned oil can then be drained off via an outlet screw in the container. The cleaned, liquid Freon is forced into the disposal container. Because of the high positive pressure generated by the compressor, the aspiration phase or in other words the evacuation phase of the refrigeration cycle lasts about another 10 to 15 minutes. Because the refrigerant is liquefied by the high pressure, its volume is also reduced, so that it can be collected in relatively small disposal containers. The process of aspiration is continued until such time as a negative pressure of 1.5 bar has been produced in the refrigeration cycle. It is then assured that virtually the entire Freon filling (approximately 95%) has been removed from the refrigeration cycle. The attainment of the desired negative pressure in the refrigeration cycle, as well as the positive pressure built up by the compressor, can be monitored and adjusted electronically. The precise adjustment and monitoring of the positive pressure is of great importance, given the quite various types of disposal containers.

It is proposed that the method be controlled automatically, with electrically actuated magnetic valves being used for opening and closing the suction or pressure strip. In the event the system should fail, the magnetic valves are closed immediately, which also happens when the desired positive pressure or negative pressure is attained. The automatic control is also responsible for the closure of the magnetic valves once the desired fill quantity in the disposal container is attained. The automatic control precludes improper handling of the outlet and inlet valves, which was quite possible in the method described in German Patent 30 01 224.

To protect the compressor from overheating, a fan or ventilator is provided in the known fashion, which is intended to dissipate the heat produced in the compression process. However, it is additionally provided that the compressor is cooled by the suction line itself. To this end, the suction line is wound around the compressor. By the as yet uncompressed refrigerant in the suction line, not only is the compressor cooled but also, because of the heat absorbed by the refrigerant, it is assured that the refrigerant will remain in the gaseous state until it arrives in the compressor.

It is also provided that upon attainment of a predetermined filled weight in the disposal container, the aspiration process is shut off. To this end, the disposal container rests on a scales, which indicates only the net weight of the refrigerant to be introduced. This assures that depending on the type of disposal container involved, only the filling quantity prescribed for it will ever be introduced into it.

It is further provided that a measurement of the refrigerant is performed prior to the beginning of aspiration at the refrigeration system. For this purpose, a sensor that indicates the content of refrigerant in the refrigeration cycle is used. If the refrigerant content is too low, the apparatus according to the invention need not even be put into operation. A further important advantage of the method according to the invention is that at the same time as the refrigerant is removed, the used oil from the compressor of the refrigerator to be disposed of can also be aspirated and collected. The contaminated filters are cleaned of residues by aspiration with the aid of negative pressure containers. The charcoal filters are changed at regular intervals.

The apparatus for performing the method is provided, in addition to the structural characteristics already mentioned above, with a pipeline downstream of the inlet fitting; by means of this pipeline, the aspirated refrigerant remains in the gaseous state.

Advantageously, the apparatus is disposed in a transportable housing with acoustically insulating walls. This assures that the disposal of refrigeration systems can be done at any desired location, without imposing excessive noise on the environment. The compressor may be driven by an internal combustion engine, so that the presence of an electrical connection need not be required in order to perform the method. To enable use of the system in rooms threatened with explosion or in underground mines, the housing is encapsulated in such a way that it meets the "ex" standard for explosion proofing.

Further details and advantages of the invention will become apparent from the ensuing detailed description, taken in conjunction with the drawings.

BRIEF DESCRIPTION OF THE DRAWINGS

FIG. 2 shows an oil collection container;

FIG. 3 shows fixtures for the oil collection container;

FIG. 5 shows an alternative embodiment of the container for oil processing.

DESCRIPTION OF THE PREFERRED EMBODIMENTS

Figure 1:
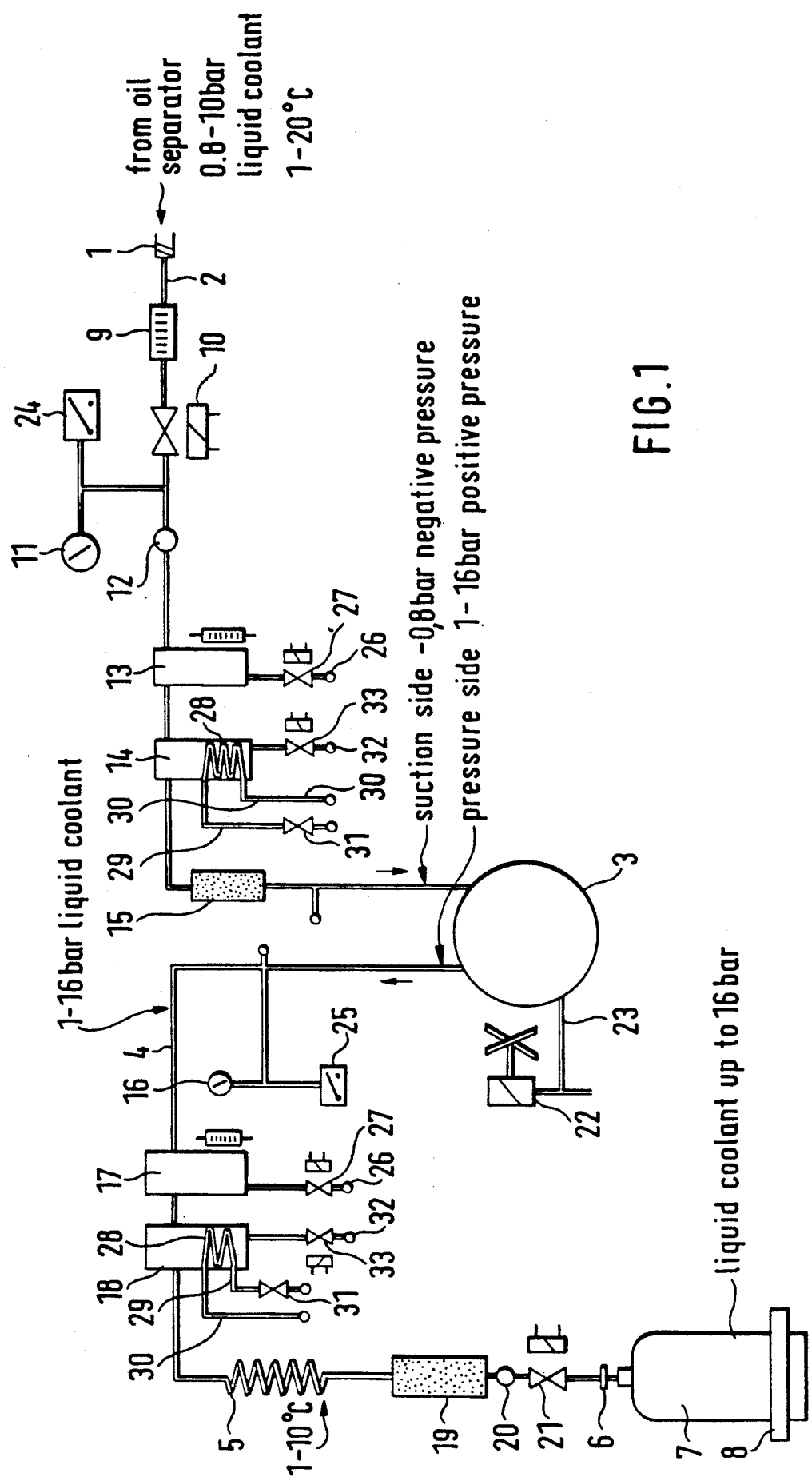
FIG. 1 is a basic illustration of an apparatus for recovering and processing refrigerants.
Figure 4:
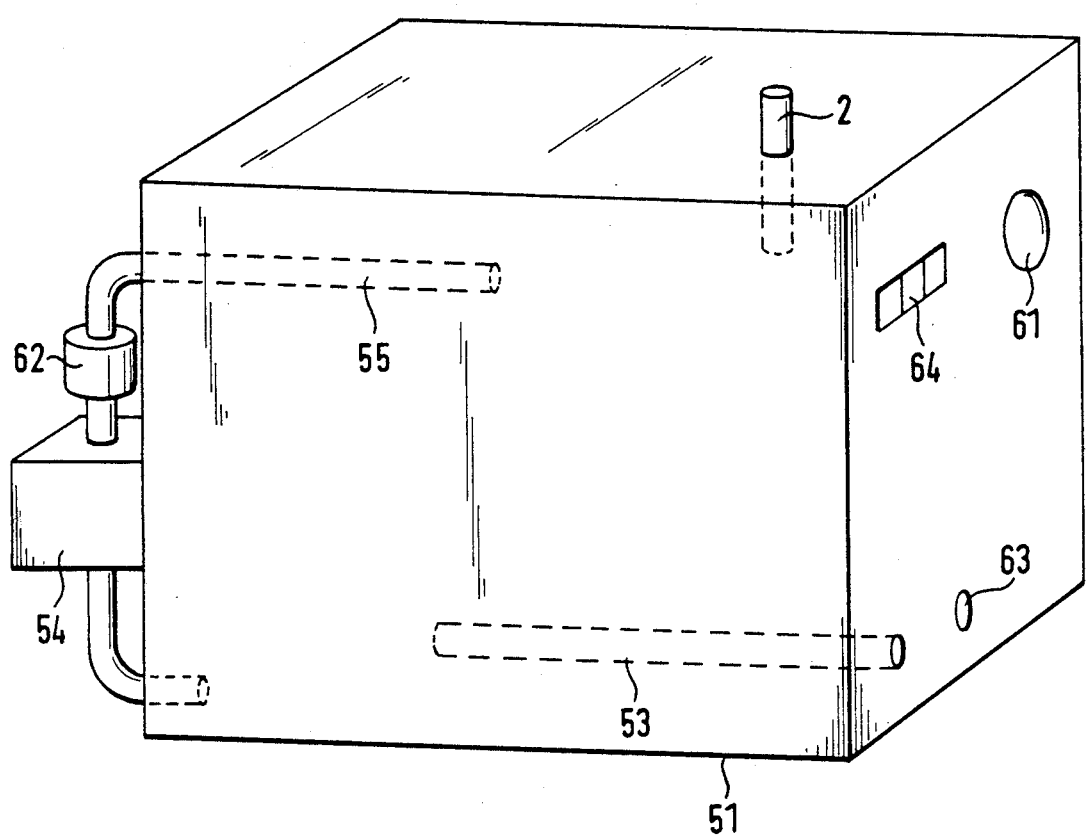
FIG. 4 shows a container for oil processing.

FIG. 1 is a basic illustration of an apparatus for recovering and processing refrigerant from a refrigeration system, not shown. The apparatus is accommodated in a housing, not shown. Protruding from the housing is an inlet fitting 1, to which a line can be attached that connects the inlet fitting 1 to the outlet fitting of the refrigerator to be disposed of. If such an outlet fitting is not provided on the refrigerator, then the refrigerant cycle is tapped with the aid of a tap valve. From the inlet fitting 1, a line 2 leads to a compressor 3. From the compressor 3, a further line 4 leads via a condenser 5 to an outlet fitting 6. A disposal container 7 that rests on a weighing apparatus 8 is connected to the outlet fitting 6. The line 2 will henceforth be called the suction line and the line 4 will be called the pressure line. A pipe heater 9, an electrically operated magnetic valve 10, a manometer 11 for measuring the negative pressure to be attained in the suction line 2, an observation window 12, an oil filter 13, a water filter 14 and an activated charcoal filter 15 are disposed in succession in the course of the suction line 2, downstream of the inlet fitting 1 in the direction toward the compressor 3. As the oil filter 13, a filter element for removing oil, water and dirt down to one micron in size is used. The remaining oil content after filtration is less than 0.5 mm/cm. The filtration of liquid water is greater than 95% effective, and the permeability of the filter by the DOP test is less than 0.03%. The water filter 14 removes water and dirt aerosols down to 0.01 μm. The remaining oil content downstream of the filter is less than 0.01 mm/cm. The permeability of the filter 14, by both the DOP test and the sodium flame test, is less than 0.0001%. The activated charcoal filter 15 removes acetic acids, any other chemical compounds still present, and odors from the refrigerant. Downstream of the filter, the residual oil content is less than 0.003 mm/m. In the pressure line 4, downstream of the compressor 3 in the direction toward the outlet fitting 6, the following elements are disposed in succession: a manometer 16 for measuring the positive pressure to be obtained, an oil filter 17, a water filter 18 and a further activated charcoal filter 19, as well as a further observation window 20 and a magnetic valve 21. For cooling the compressor 3, a fan 22 is provided, which is regulated via a sensor 23 with a temperature switch; the sensor 23 measures the temperature of the compressor 3. For further cooling of the compressor 3, the suction line 2 is wound around it. The heat produced upon compression is thus transferred via the compressor wall to the suction line 2, and to the gaseous refrigerant located in it, causing heating of the refrigerant and preventing premature liquefication of the refrigerant. Both the manometer 11 and the manometer 16 are equipped with a pressure switch, with the aid of which the system is switched off, in the first case when the intended negative pressure is attained, and in the second case when the desired positive pressure is attained. The pressure switches are identified by reference numerals 24 and 25. Both the oil filter 13 and the oil filter 17 have a heater as well as an outlet 26, which can be opened and closed with the aid of an electrically operated magnetic valve 27. The water filter 14 or 18 has a cooler 28. This cooler 28 comprises a line segment 29 which branches off from the suction line 2 and is wound spirally around the water filter. The other end 30 of the winding communicates with the pressure line 4. The lines 29 can be shut off with the aid of a valve 31. The water filters 14, 18 also have an outlet fitting 32, which can be shut off with the aid of an electrically operated magnetic valve 33. All the electrical valves, heaters, regulating switches, fans and the weighing apparatus are switched or regulated by an electronic control means.

In a preferred embodiment, a sensor (not shown in further detail) for measuring the refrigerant component in the refrigeration cycle is located between the inlet fitting 1 and the pipe heater 9.

The apparatus operates as follows: Once the inlet fitting 1 has been connected to the outlet of the refrigeration system, the compressor 3 is started. After a slight delay, such as 3 seconds, the magnetic valves 10 and 21 then open. The refrigerant present at the inlet fitting at a pressure of 0.8 to 10 bar is now aspirated from the refrigerant cycle and is first heated in the pipe heater, so that the refrigerant flows in the gaseous phase through the suction line 2. The compressor 3 establishes a negative pressure of −0.8 bar in the suction line 2. On the way to the compressor 3, the gaseous refrigerant first passes through the oil filter 13. The filtered-out oil is removed to a separate vessel via the magnetic valve 27 and the outlet fitting 26. Before that, any remaining Freon still in the oil is expelled by the oil filter heater and returned to the suction line 2. The refrigerant, from which the oil has been removed, now flows through the water filter 14. The moisture present in the refrigerant is removed. As a result of the cooling effected by the cooler 28, the water condenses and is likewise removed to a separate container via the magnetic valve 33 and the outlet fitting 32. Now, only dirt particles are present in the refrigerant, and they are filtered out in the activated charcoal filter 15, so that relatively pure refrigerant reaches the compressor 3. In the compressor 3, the refrigerant is compressed to a positive pressure of up to 16 bar and carried via the pressure line 4 to the second oil filter 17, the water filter and the second activated charcoal filter 19, so that oil residues from the compressor 3 as well as contaminants and moisture absorbed from the refrigerant in the filters are removed. The refrigerant, which has been heated upon compression and then cooled down again to from 1° to 10° C. by the fan 22 and by the suction line 2 wound around the compressor 3, is carried via the condenser 5, as a result of which the refrigerant cools further and remains liquid. The liquid and cleaned refrigerant flows through the opened magnetic valve 21 into the disposal container 7. In the disposal container 7, the liquid refrigerant has a pressure of up to 16 bar. The electronically adjustable scales are adjusted such that only the net weight of the refrigerant that has been introduced into the container is indicated. Once the permissible quantity of refrigerant in the disposal container has been attained, the disposal system is switched off, and a beep sounds. However, it is also possible to connect a tee to the outlet fitting 6, so that two disposal containers 7 can be connected side by side to the system. Once one disposal container is filled, the system then is not shut off but simply switched over to the empty disposal container. The manometer 11 indicates the negative pressure that is established in the suction line 2. Once a negative pressure of approximately 1.5 bar is attained, the system is switched off with the aid of the negative pressure switch 24; that is, the compressor 3 is shut down and the magnetic valves 10 and 21 are closed. The manometer 16 monitors the pressure side. If the required positive pressure is exceeded, for instance if the filters are stopped up, then the system is again shut off via the pressure switch 25. Connecting the outlet fittings 26 and 32 of the oil filter and water filter, respectively, to a negative-pressure container, frees these filters of any remaining contamination. The activated charcoal filters 15 and 19 are changed from time to time.

The refrigerant recovered in this way has a degree of purity that permits immediate re-use.

For safety reasons, an emergency OFF switch is incorporated into the electrical current circuit of the apparatus, to assure an immediate shutoff of all the electrical systems. A monitor light for an existing grounding means is also provided, which protects the system and the operators from static charges and sparkovers from the charge.

The efficiency of the system is approximately 95% of the refrigerant to be aspirated. Up to 100% of the motor oil can be removed from the system.

In refrigeration systems that are filled with ammonia, the system should be used as follows:

The disposal container 7 is put at 1.5 bar of negative pressure, and a tap valve is screwed to the fill fitting of the refrigeration cycle. After that, the communication between the container 7 and the tap valve should be established by means of a pressure hose. The tap valve is then screwed into place, and the valve of the disposal container 7 is opened. The ammonia now flows into the disposal container 7. After emptying, the cycle should be put at negative pressure, and once the negative pressure is attained it should be filled with tap water, to prevent corrosion by any residues that may be present.

FIG. 2 shows an oil collecting container that has a threaded opening 58 in the vicinity of its lid. The fixture 59 is screwed into this threaded opening 58. The fixture 59 substantially comprises a suction line 2 originating in the refrigerating apparatus to be disposed of, and this line can be shutoff via an electric valve 6. The arriving line 2 ends just above the bottom 52 of the container 51. The fixture 59 also comprises a segment of the suction line 2 leading from the container 51, the opening of this line on the suction side being located just below the lid of the container. Also, a manometer 61 and an electric fill level gauge 56 are disposed on the fixture. The arriving mixture of oil and refrigerant, which is at a pressure of from 0.5 to 6 bar, is introduced via the line 2 into the container 51, which has a negative pressure of down to 0.5 bar, where the oil settles on the container bottom 52, while the volatile refrigerant components collect at the lid side of the container 51. Via the suction line 2 leading out of the container, the Freon is then aspirated. It can be supplied to the reprocessing operation of the above-described type, and is present at a pressure of from 0.5 to 8 bar at the inlet fitting 1. However, it can also be subjected to filtration with milk of lime, with decomposes the refrigerant. This alternative is shown in FIG. 5. In order to separate out the last residue of Freon from the oil, the oil collected at the bottom is heated with the aid of a heater 53 to from 80° to 150° C., continuously circulated with the aid of a circulating pump, and atomized via a spray arm 55 in the container 51. The heated and finely distributed oil then causes the remaining refrigerant to evaporate, and it likewise collects in the upper region of the container and is delivered with the aid of a line 70, via the pump 71, to a milk of lime filter 72. In the milk of lime filter 72, the Freon is for the most part chemically decomposed. Any remaining Freon still present is carried via the line 73 to an afterburner system 74, in which the remaining Freon is combusted completely at a temperature of 900° C. In order to remove other foreign substances from the deposited oil, an oil dirt filter 62 is disposed between the circulating pump 54 and the spray arm 55. The cleaned oil can then be removed from the container via the oil outlet fitting 63. The ON/OFF switch 64 for the heater, which at 220 V puts out 1500 Watts, and for the circulating pump and the manometer is located on the side wall of the container 51.

What is claimed is:

1. A method for disposal and recovery of gaseous refrigerant from refrigeration systems comprising the steps of:

aspirating the refrigerant by use of a compressor, from the refrigeration system at an elevated temperature such that the refrigerant remains in the gaseous phase;

passing the refrigerant in sequence through an oil filter, a water filter and an activated carbon filter in order to remove the contaminants of oil, water and particulate matter respectively;

collecting each separated said contaminant in a separate container;

passing the refrigerant through said compressor in order to compress the refrigerant and cause it to enter a liquid phase;

passing the refrigerant in sequence through a second oil filter, a second water filter and a second activated carbon filter in order to remove the contaminants of oil, water and particulate matter respectively;

collecting each separated said contaminant in a separate container; and collecting the refrigerant in said liquid phase in a disposal container.

2. A method as in claim 1, comprising the further step of cooling the refrigerant after the refrigerant enters said compressor in order to further promote the refrigerant entering said liquid phase.

3. A method as in claim 1, comprising the further step of heating said container for collecting said contaminant oil from said first oil filter such that the refrigerant contained in said contaminant oil is caused to evaporate, and causing said evaporated refrigerant to enter said first water filter.

4. A method as in claim 3, wherein said container for collecting said contaminant oil from said first oil filter is provided with a circulating pump and an atomizer spray arm in communicative operation with said circulating pump, in order to promote atomization of said oil contaminant and evaporation of the refrigerant.

5. A method as in claim 3, wherein said oil is heated to from about 80° C. to about 150° C.

6. A method as in claim 1, wherein said step of passing the refrigerant through aid compressor in order to compress the refrigerant and cause it to enter a liquid phase, causes the refrigerant to be pressurized to about 16 bar.

7. A method as in claim 1, wherein electrically actuated magnetic valves are used for automatic control.

8. A method as in claim 1, comprising the further step of employing the refrigerant to cool said condenser.

9. A method as in claim 1, comprising the further step of monitoring the weight of said disposal container, and stopping said step of aspirating the refrigerant when a predetermined fill weight of said disposal container is reached.

10. A method as in claim 1, comprising the further initial step of measuring the amount of refrigerant in the refrigeration system.

11. A method as in claim 1, comprising the additional step of providing a first refrigerant line under suction extending from the refrigeration system to said compressor, and a second refrigerant line under pressure from said compressor to said disposal container.

12. A method as in claim 11, comprising the additional step of monitoring the pressure in both said first and said second refrigerant lines, and stopping said step of aspirating when a predetermined pressure is achieved.

* * * * *

UNITED STATES PATENT AND TRADEMARK OFFICE
CERTIFICATE OF CORRECTION

PATENT NO. : 5,018,361

DATED : May 28, 1991

INVENTOR(S) : Willi Kroll et al.

It is certified that error appears in the above-identified patent and that said Letters Patent is hereby corrected as shown below:

Title page, under the heading "ABSTRACT," line 3, delete the first occurrence of the word "refrigerant" and substitute therefor --refrigerating--.

In Column 8, line 32, delete the word "aid" and substitute therefor --said--.

Signed and Sealed this

Twenty-second Day of September, 1992

Attest:

DOUGLAS B. COMER

Attesting Officer     Acting Commissioner of Patents and Trademarks